United States Patent [19]

Isidoro

[11] Patent Number: 4,877,047
[45] Date of Patent: Oct. 31, 1989

[54] CONTROL MECHANISM FOR CONTROLLING THE WATER SUPPLY IN AN IRRIGATION SYSTEM AND SIMILAR, OPERATING BY MEANS OF PRESSURE PULSES

[76] Inventor: Guido Isidoro, Fraz.Com.S.Casciano V.di Pesa, Via per Cerbaia, 8A, Frienze, Italy

[21] Appl. No.: 259,040

[22] Filed: Oct. 17, 1988

[30] Foreign Application Priority Data

Oct. 16, 1987 [IT] Italy .................................. 9514 A/87

[51] Int. Cl.[4] .................... F16K 11/02; F16K 31/18
[52] U.S. Cl. .............................. 137/119; 137/624.18; 251/230
[58] Field of Search .......................... 137/119, 624.18; 251/230; 239/66

[56] References Cited

U.S. PATENT DOCUMENTS

| | | | |
|---|---|---|---|
| 3,459,208 | 8/1969 | Clyde | 137/119 |
| 3,924,652 | 12/1975 | Kah | 137/119 |
| 4,116,216 | 9/1978 | Rosenberg | 251/230 |

Primary Examiner—Alan Cohan
Attorney, Agent, or Firm—McGlew and Tuttle

[57] ABSTRACT

The mechanism prevents erroneous commands caused by brief accidental pulses an dcomprises, in conjuction with a rotary shutter that moves intermittently, a chamber with a float connected to said shutter, the pressure on which is generated by the arrival of fluid and the resultant filling of said chamber; a discharge device causes said chamber to empty slowly within a period of time that is not less than a predetermined limit and which starts when the working pressure is released; cam devices cause a one-step movement of said shutter only when said chamber is completely empty.

10 Claims, 4 Drawing Sheets

CONTROL MECHANISM FOR CONTROLLING THE WATER SUPPLY IN AN IRRIGATION SYSTEM AND SIMILAR, OPERATING BY MEANS OF PRESSURE PULSES

FIELD OF THE INVENTION

The invention concerns an automatic hydraulic valve which, directly or via a normal valve of larger capacity, is able to control the opening of the pressurized fluid supply system after a predetermined number of successive pulses caused by a break in the flow of and the entry of the fluid itself into the pipe upstream of the valve fitted onto it. The valve ensures maximum reliability in the programming of the system because it distinguishes between the pressure variations that are caused in order to actuate the program and those that are not required and which are caused accidentally by hydraulic disturbances in the pipes.

BACKGROUND OF THE INVENTION

Various types of programmed valves are already known and these are used to automate hydraulic systems, opening and closing the system in order to allow the fluid to pass thru without direct manual intervention at the time the operation takes place and allowing the fluid to be distributed automatically and successively from several valves fitted to the pipe, with electric pulses or hydraulic pulses in a hydraulic supply system, or a mixture, or pulses programmed from complex and delicate equipment. The commands are conveyed to the valve by means of electric or hydraulic lines.

Also known are valves whichprogram the sequence by which they open and close by controlling the flow, a new command being received every time a variation in the pressure of the fluid upstream of the valve itself is detected; each time, the sequence of pulses causes one or more valves, which are different from those that opened previously and from those that will open subsequently, to open. These valves do not distinguish between the variations produced deliberately and those which occur accidentally as a result of the conditions in the hydraulic system to which they are connected, so that there is little reliability as regards the desired sequence of opening and closing and an irrigation program—for example—may therefore be altered.

SUMMARY OF THE INVENTION

The main purpose of the invention is to supply a valve which offers the maximum reliability by eliminating control operations which are caused by accidental, and not desired, pressure variations which are due to disturbances to the water in the pipes. It may be fitted close to the irrigator or a series of irrigators and therefore allows the system to be set up in the most practical way possible without imposing any constraints.

The invention concerns a control mechanism for controlling the supply of the liquid in a water supply system which comprises, in conjunction with a rotary shutter that moves intermittently and with cam control profiles which are able to cause said movement in response to axial movements, a chamber with a float connected to said shutter, the pressure on which is generated by the arrival of fluid and the resultant filling of said chamber; a discharge device is provided to empty said chamber within a period of time that is not les than a predetermined limit which starts when the working pressure is released; and devices are provided to cause a one-step movement of said shutter only when said chamber is completely empty.

In practise the cam control profiles comprise : vertical guide grooves which can engage the components of the shutter and the float against the direction of rotation for a substantial part of the vertical path which the float can travel; and fixed, inclined profiles at the bottom which work in conjunction with pawls on the float to cause an angular one-step movement when the float has stopped descending and starts to rise again. Said guide grooves and said fixed profiles may be inside the float chamber or may be separate from it but they will always be able to work in conjunction with the components of the float and the shutter.

The discharge device may be a siphon-type discharge device, controlled by a check valve and a discharge flow metering device; the arrangement means that the siphon-type discharge can be closed by means of said check valve, whenever and as long as there is pressure in the chamber, and the chamber itself can be emptied via the siphon-type discharge device and the metering device when the pressure is released; the time taken for the chamber to empty is longer than the duration of any accidental pulses.

The shutter may be connected to the float with an angle bracket and with a restricted amount of play which is at least axial.

Clearly the components of the shutter can be operated from the outside in order to set an initial position for the purposes of programming the distribution system.

The shutter can be replaced or operated with devices for selectively blocking off sections and holes so as to vary the sequence of the pre-arranged controls and the program and, in particular, to vary the ratio between holes and pipe sections or radial discharge outlets.

At least one more chamber may be connected to the chamber which contains the flaot in order to increase the volume to be discharged via the flow metering device; the two chambers are connected like communicating vessels.

The shutter may be put directly into the supply pipe to be controlled or it may be put into a hydraulic valve control pipe.

A universal or ball joint may be provided between the float and the components of the rod and the shutter/distributor. This arrangement is particularly appropriate when the shutter's guide and control profiles are separate from the float chamber.

DESCRIPTION OF THE PREFERRED EMBODIMENTS

The drawing illustrates a simplified and non-exhaustive form of the invention in diagrammatic form.

Figure 1:
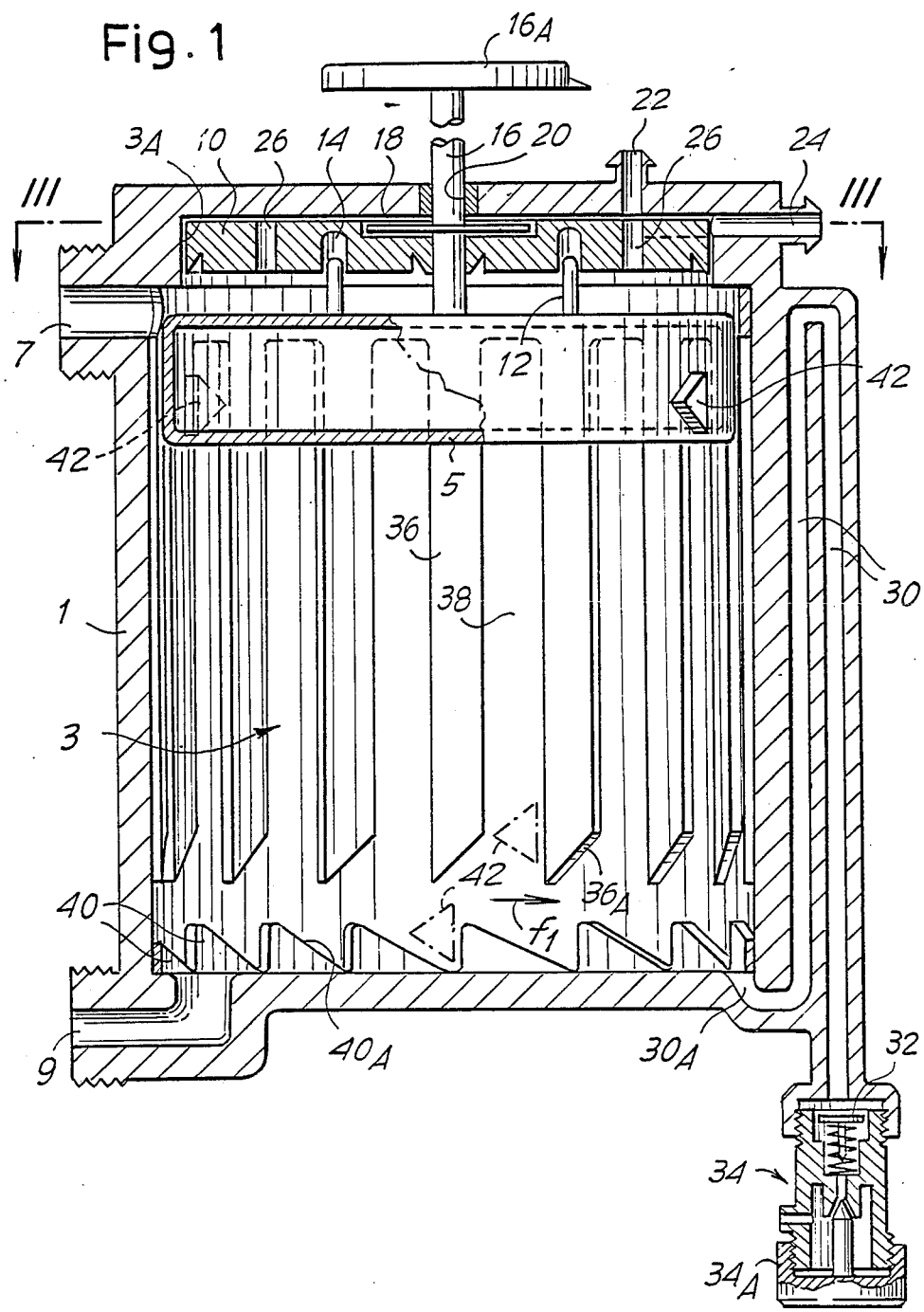
FIGS. 1 and 2 are a vertical section of the mechanism and its housing, without the internal contents.
Figure 2:
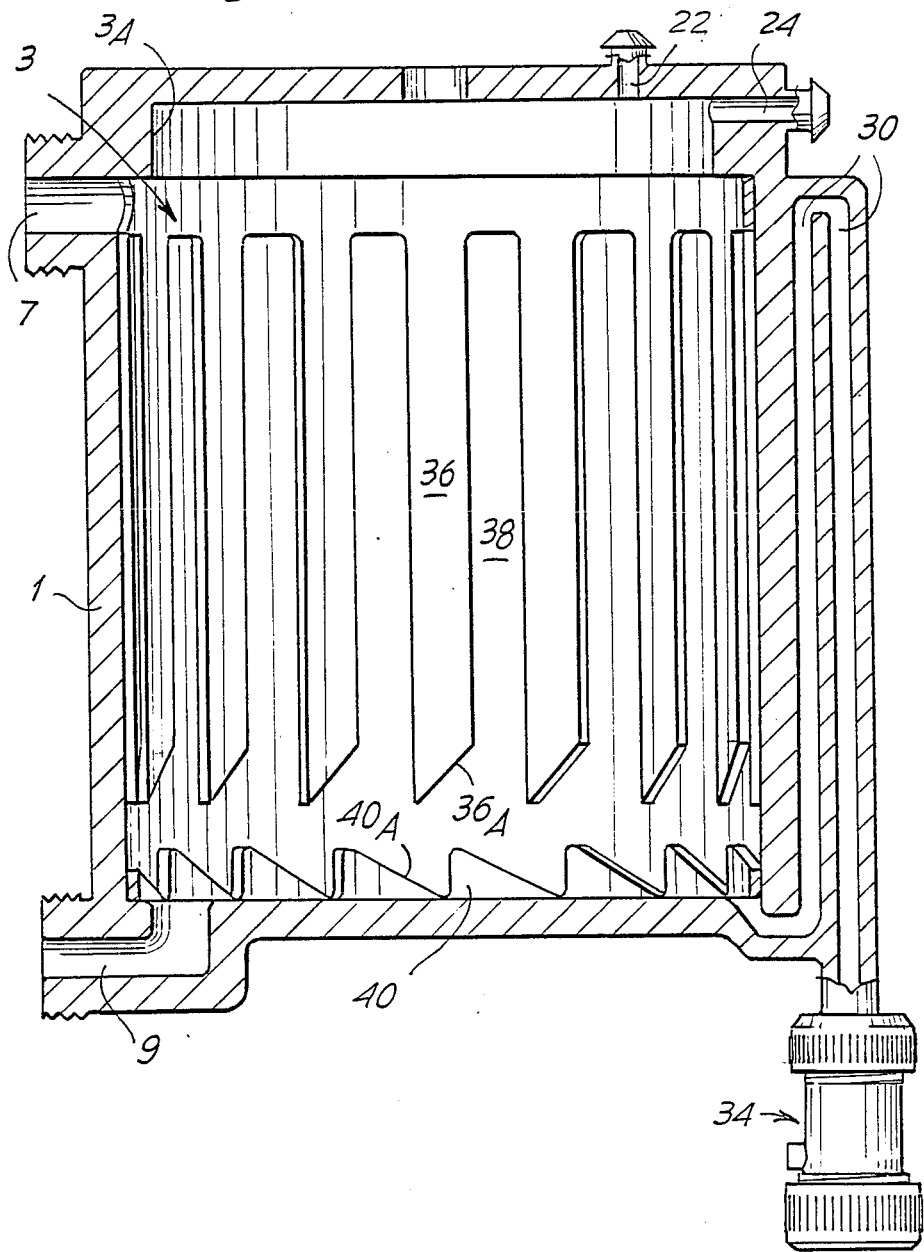
Figure 3:
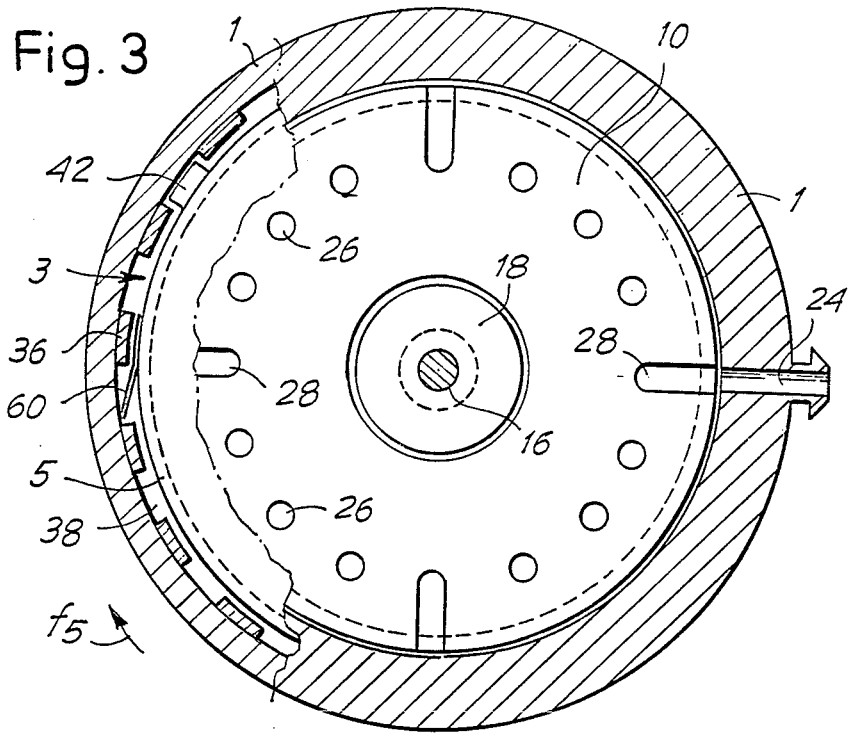
FIG. 3 is a plan view of the shutter thru III—III in FIG. 1.
Figure 4:
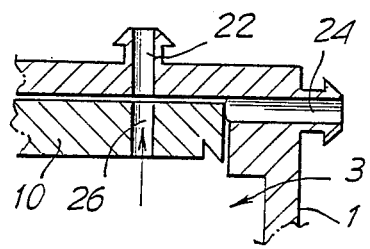
FIGS. 4 and 5 are local sections similar to that shown in FIG. 1, to illustrate two possible control positions.
Figure 5:
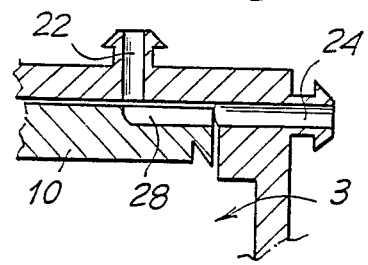

According to the illustrations in FIGS. 1 to 5, 1 is a housing that forms a chamber3 of a capacity that is suitable for the purposes described below. A float 5 may slide inside chamber 3. 7 and 9 are two alternative access points by which chamber 3 via normal check valves upstream (when there are gradients). The diameter of the top part 3A of chamber 3 is slightly smaller than the main part of the chamber, to receive a shutter and distributor 10 which can slide in part 3A of said chamber with a suitable seal. Shutter 10 is connected to float 5 so that it can slide axially with respect to it to some extent and yet be engaged on the float so that it can rotate. For this purpose the float has a set of pegs 12 which engage in seats 14 on shutter 10, which is also connected to a central rod 16 which comes out of the float and passes through the top wall of chamber 3, 3A to house a handwheel 16A to make angular movements as described below; rod 16 has a shoulder disk 18 which restricts the movement of shutter 10 along rod 16 with respect to float 5, so that the shutter's own seats 14 are engaged in pegs 12 on the float so as to prevent any angular movements. The top of the chamber 3, 3A has open sections as follows : 20 for rod 16; 22 for controlling any hydraulic valve connected to the mechanism; and 24 for discharging via said hydraulic valve thru open section 22. The float has a number of holes 26 equivalent to openings 22 and 24 which correspond with hole 22 and in some of the angular positions it also has sections 28 instead of holes 26 (see FIG. 3), whose purpose is to cause hole 22 and hole 24 to communicate in some of the angular positions which shutter 10 may occupy. FIG. 4 shows a position in which chamber 3 and open section 22 communicate via one of the holes 26, with hole 24 being blocked off, whilst FIG. 5 shows a position in which hole 22 and hole 24 communicate via one of the sections 28.

Housing 1 accommodates a siphon-type discharge device 30 with a mouth 30A that faces towards chamber 3 and an outlet which corresponds with check valve 32 which can be opened when there is no pressure in chamber 3 whereas the pressure in chamber 3 causes the siphon outlet to close; the siphon is discharged via a flow regulator 34, the discharge hole of which can be controlled with a screw control 34A or similar means. Siphon 30 and discharge device 34, 34A are arranged in such a way that the discharge is shut off when check valve 32 closes when there is pressure inside chamber 3 in housing 1 whereas when there is no pressure in chamber 3, siphon 30 is triggered for discharging via flow regulator 34; if pressure does not return to chamber 3, however, it will empty more or less slowly via siphon 30 according to the setting of regulator 34.

The inside of the wall of housing 1, which forms the boundary of the central part of chamber 3, has a set of vertical ribs 36 and hence vertical grooves 38; the bottom of each rib 36 has an inclined edge 36A, the bottom tip of which mates with the intermediate part of a corresponding inclined edge 40A on a cam assembly 40 which is of sawtooth design; the vertical parts of the sawtooth edges mate with the smooth ends 36A of ribs 36 in an intermediate position; edges 36A and the edges of the cam 40 are some distance apart. At the side of float 5 is at least one pawl or a set of pawls 42, which or each of which may slide in a groove 38 and mate with inclined edges 36A and 40A for the purposes described below. In practise, pawl or each pawl 42 is triangular in shape with two smooth edges which are approximately equivalent to the inclination on edges 36A and 40A. When chamber 3 empties, float 5 descends and pawl or pawls 42, on the side of the float, run along grooves 38 without being able to rotate until a position that is roughly adjacent to the bottom end of chamber 3 is reached; at this point pawl or pawls 42 make contact with edges 40A, having left their grooves 38; in this position, when float 5 completes its descent, it advances slightly at an angle as pawl or pawls 42 slide along inclined edges 40A; when float 5 begins to rise again because the chamber is refilled, pawl or pawls 42 reach inclined edge 36A above the position they had reached and, running on edges 36A, pawls 42 cause float 5 to advance slightly at an angle again until the pawl or each pawl engages in a groove 38 adjacent to the one in which it had run when the float descended. The result of this is that every time chamber 3 is emptied and refilled again, float 5 twice makes a complete angular movement in the direction of arrow f1, causing the pawl or each pawl 42 to pass from one groove 38 to the next one.

From the above description it can be seen that every time chamber 3 is emptied and refilled again, float 5 and hence shutter 10 make a complete angular movement and maintain the new position during all the movements that float 5 may be forced to make as a result of chamber 3 emptying and partially refilling; only when chamber 3 is completely emptied again via siphon-type discharge system 30, 32, 34 is there a new angular movement, caused by pawl or pawls 42 mating with edges 40A and 36A. For every angular position that float 5 may occupy as a result of pawl or pawls 42 engaging in a groove 38, shutter 10 is positioned in such a way that hole 22 coincides successively with one of holes 26 or one of sections 28, in the latter case with section 28 causing hole 22 to communicate with hole 24.

Taking account of the structure of shutter 10 as illustrated in FIG. 3, each time float 5 and hence shutter 10 are fully raised after said float 5 has fully descended), three holes 26 are successively positioned with respect to hole 22, followed by a combination of a section 28 and hole 22 and hole 24. The result of this is that when chamber 3 has emptied three times, chamber 3 itself communicates with hole 22 via the three successive adjacent holes 26 in shutter 10; after chamber 3 has emptied for the fourth time there is a combination of a section 28 between holes 22 and 24 and three further successive emptying operations with communication between chamber 3 and hole 22. When chamber 3 partially empties, float 5 remains engaged with pawl or pawls 42 in grooves 38 and so shutter 10 returns to its previous position and the partial emptying operations of chamber 3 do not cause the components of float 5 and shutter 10 to move at an angle.

Figure 7:
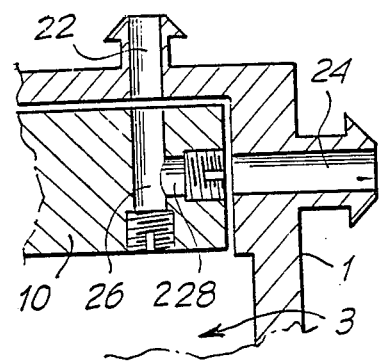

The sequence of changes can be varied by modifying the structure of distributor 10, i.e. the alternation of sections 28 and holes 26. This may be achieved in various ways, such as replacing shutter 10 or providing various combinations of plugs. A suitable solution is that shown in FIG. 7 where holes 228 replace sections 28 and these holes 228, in addition to holes 26, may easily be plugged and opened—with screw plugs or similar—to achieve the desired sequences; one hole 228 may coincide with each hole 26.

From the above description it is clear that by controlling pulses on a hydraulic line which connects a number of mechanisms via openings 7 or 9 it is possible to create control pulses that are perfectly controlled with periods of pressure which ensure that float 5 occupies the desired raised position and hence shutter 10 its desired angular position, interspersed with breaks in the pressure which last longer than it takes to empty each chamber 3 via siphon-type discharge system 30, 32, 34 which is appropriately set up and controlled. All the accidental pulses caused by unexpected variations in the working pressure, which may be of shorter duration than the time taken to empty chambers 3, do not affect the control program for shutter 10 because they are of shorter duration than the time taken to empty chambers 3 and do not alter the position occupied by the components of float 5 and shutter 10 as a result of the control pulses along the pressure feed lines to chambers 3 in a system. Open section 22 may have a hydraulic valve which therefore continues to be controlled to open, for example, throughout the period in which there is pressure in chambers 3 and hence in the hydraulic valve which maintains its position even when there is a brief, accidental variation in the pressure; only long-term shut-off of the control line by the programmed pressure pulses can cause shutter 10 to move until it reaches - in the desired positions and at the rate required - the position of a section 28 or a hole 228 between hole 22 and hole 24 which also causes the hydraulic valve to discharge and thus gives a command to close, for example (or open) when float 5 is rising due to pressure. All the variations in pressure with respect to the regular position of the control line which feeds chambers 3 will have no effect as regards the requirements the hydraulic valve is to meet when and as long as such variations are of shorter duration than the control pulses.

By suitably setting the initial positions of a number of mechanisms in a system, which can be done by operating handwheel 16A when float 5 has descended, it is possible to obtain the desired sequence for the various hydraulic valves connected to the various mechanisms and hence to program the hydraulic valves in an irrigation system or similar to open in succession as desired, by positioning the individual components of float 5 and shutter 10 with respect to the others in the said system.

Figure 6:
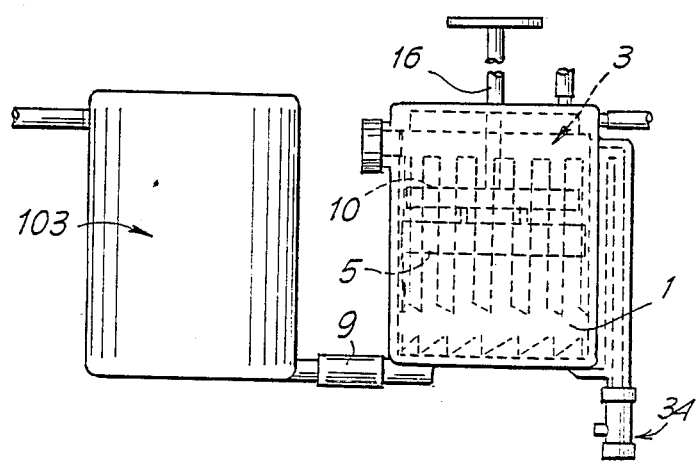
FIG. 6 shows a system which enables a larger volume of water to be used for the control and FIGS. 7 to 9 show practical alternatives.

When the mechanism requires to be programmed for a very long interval between one control pulse and the next, instead of increasing the volume of the one chamber 3 it is possible and advantageous to connect to chamber 3 of the type described above at least one more chamber as illustrated by 103 in FIG. 6, which communicates with chamber 3 via openings 9, in the form of a system of communicating vessels so as increase the time taken to empty the chamber in which float 5 slides compared with a single chamber 3 and by controlling flow metering device 34, 34A. Several additional chambers like 103 in FIG. 6 may be combined with the same mechanism.

Float 5 must only move at an angle in one direction. In order to prevent the float from accidentally moving at an angle in the wrong direction, however, a simple mechanism may be employed, such as that represented by a small flat spring 60 (FIG. 3) which stops against ribs 36, thereby preventing float 5 from moving in the opposite direction to arrow f5 when at maximum descent.

Figure 8:
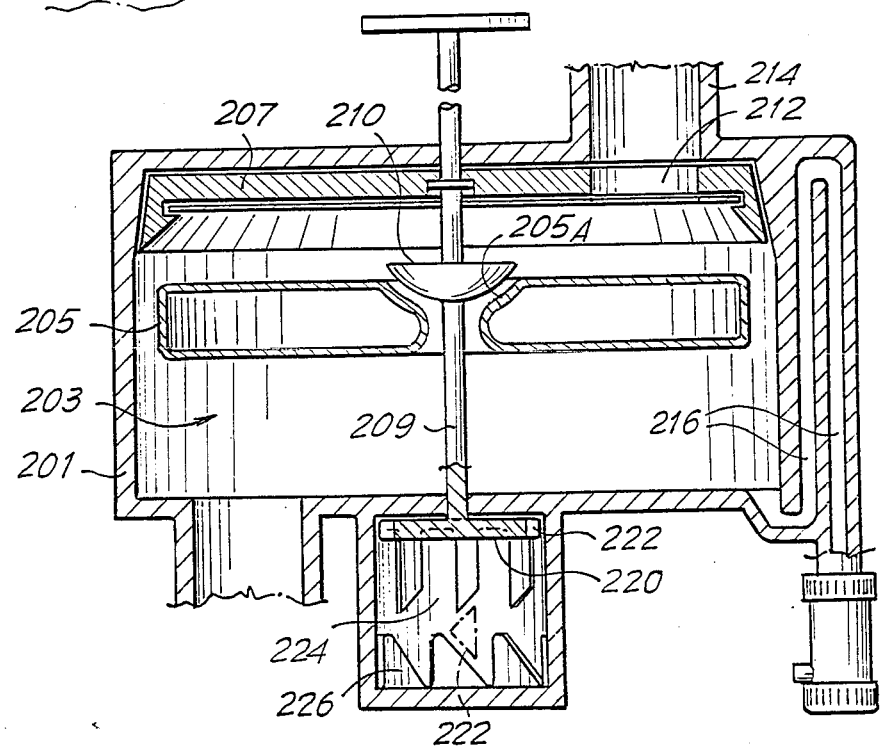

FIG. 8 shows a modified practical version which enables the housing with the float to be positioned other than perfectly vertically. 201 represents the housing which forms a chamber 203 for a float 205 to which a shutter and distributor 207 is connected. Float 205 is connected by means of a spherical surface to a rod 209 with which said shutter and distributor 207 engages; in particular rod 209 has an expanded section with a spherical cap which is able to mate with a seating with a partial spherical cavity 205A in float 205. Float 205 can adapt its angular position to suit the axis of rod 209. In this way shutter/distributor 207 may have holes or open sections such as 212 to align with openings such as 214 in housing 201 for purposes and functions that are similar to those of holes 26 and 22 in the preceding example. This version still comprises a siphon-type discharge device 216 which is similar to 30 with a discharge regulator and shutter similar to 32, 36 but the guide grooves, pawls and cams (equivalent to 38, 42 and 40) are arranged on the outside of chamber 203. In this example in FIG. 8, in fact, a unit 220 with pawls round the periphery 222, which can mate with grooves 224 and sawtooth cam profiles 226, is connected to the rod, on the outside of and in particular underneath chamber 203, the purpose being to cause components 209, 207, 220 to move at an angle and intermittently as in the previous example.

Figure 9:
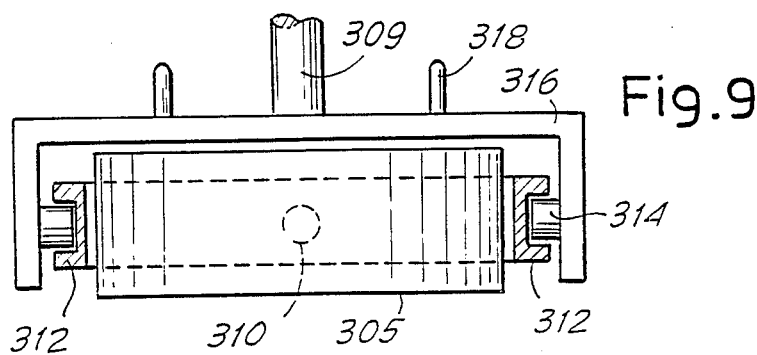

For similar purposes and as an alternative to the version shown in FIG. 8, FIG. 9 shows an arrangement in which float 305, which is similar to 205, is connected to a rod 309 which is similar to 209 or 16 via a universal joint; by means of pins 310 (which define a diametral axis) in particular, float 305 is connected to a ring 312 which surrounds float 305 and is itself connected to the components of rod 309 according to an axis orthogonal to the axis of pins 310; this latter axis is formed by pins 314 which are on a yoke 316 which is part of the unit which includes rod 309; yoke 316 may be connected to a shutter and distributor with pegs 318 whose function is similar to that of pegs 12. In this example also it is possible to incline the shutter components with respect to the float.

The drawing only shows an example of the invention, the forms and arrangements of which may vary.

I claim:

1. A control mechanism for controlling a water supply by means of pressure pulses in a water supply pipe which is capable of preventing erroneous commands caused by brief accidental pulses, comprising: a housing defining a chamber having a liquid inlet and chamber port means; a shutter in the chamber mounted for rotation and reciprocation, the shutter having shutter port means therein for registering with the chamber port means in the housing in various rotative positions of the shutter; a float positioned in the chamber operatively connected to the shutter to cause reciprocation and rotation of the shutter in response to reciprocation and rotation of the float; cam means connected to the float and connected to the housing, said cam means cooperating to effect stepped rotation of the float and shutter in response to each reciprocation thereof from an upper position to a lower position and back to the upper position in the chamber, liquid iphon discharge means connected to the chamber for discharging liquid from the chamber, a flow metering device for regulating liquid discharge through said siphon discharge means to provide a slow discharge of liquid to permit the siphon discharge means to slowly discharge liquid from the chamber in response to release of pressure in the chamber.

2. A control mechanism for controlling a liquid supply by means of pressure pulses in a liquid supply pipe, which is capable of preventing erroneous commands caused by brief accidental pulses, comprising a housing defining a chamber having a liquid inlet and chamber port means; a shutter in the chamber mounted for rotation and reciprocation, the shutter having shutter port means therein for registering with the chamber port means in the housing in various rotative positions of the shutter, a float positioned in the chamber operatively connected to the shutter to cause reciprocation and rotation of the shutter in response to reciprocation and rotation of the float, cam means having a portion connected to the float and having a portion fixed relative to the housing cooperating to effect stepped rotation of the float and shutter in response to each reciprocation thereof from an upper position to a lower position and back to the upper position in the chamber, liquid siphon discharge means for discharge of liquid from the chamber, valve means connected to said siphon discharge means having a closed position preventing liquid from discharging from the chamber and an open position allowing liquid to be discharged from the chamber, said valve means opening in response to release of pressure in the chamber to permit said siphon discharge means to empty the chamber.

3. A control mechanism according to claim 2, wherein said cam means includes vertical guide grooves disposed within said chamber, said guide grooves extending along a portion of said chamber to prevent rotation of each of said shutter and said float along a portion of a vertical path travelled by said float during said reciprocation, said float having pawls engaging said guide grooves, and fixed inclined profile means positioned within said chamber spaced from said vertical guide grooves for causing angular movement of said float upon said float reaching said lower position.

4. A control mechanism according to claim 2, wherein said shutter is connected to said float by engagement means allowing a restricted amount of radial and axial movement of said float relative to said shutter.

5. A control mechanism according to claim 2, wherein said shutter is connected to adjustment means extending outside of said chamber for initial positioning of said shutter.

6. A control mechanism according to claim 2, wherein said shutter port means includes holes which may be opened and blocked to change the alignment with said chamber port means to vary liquid discharge through said chamber port means.

7. A control mechanism according to claim 2, wherein an additional housing defining a chamber is connected to said housing chamber in order to increase the volume of liquid to be discharged.

8. A control mechanism according to claim 2, wherein said chamber port means is connected to a liquid supply system.

9. A control mechanism according to claim 2, wherein said chamber port means is connected to a hydraulic valve of a control pipe.

10. A control mechanism according to claim 4, wherein said connection means includes a universal joint portion formed between the float and a rod connected to said shutter.

* * * * *